൧

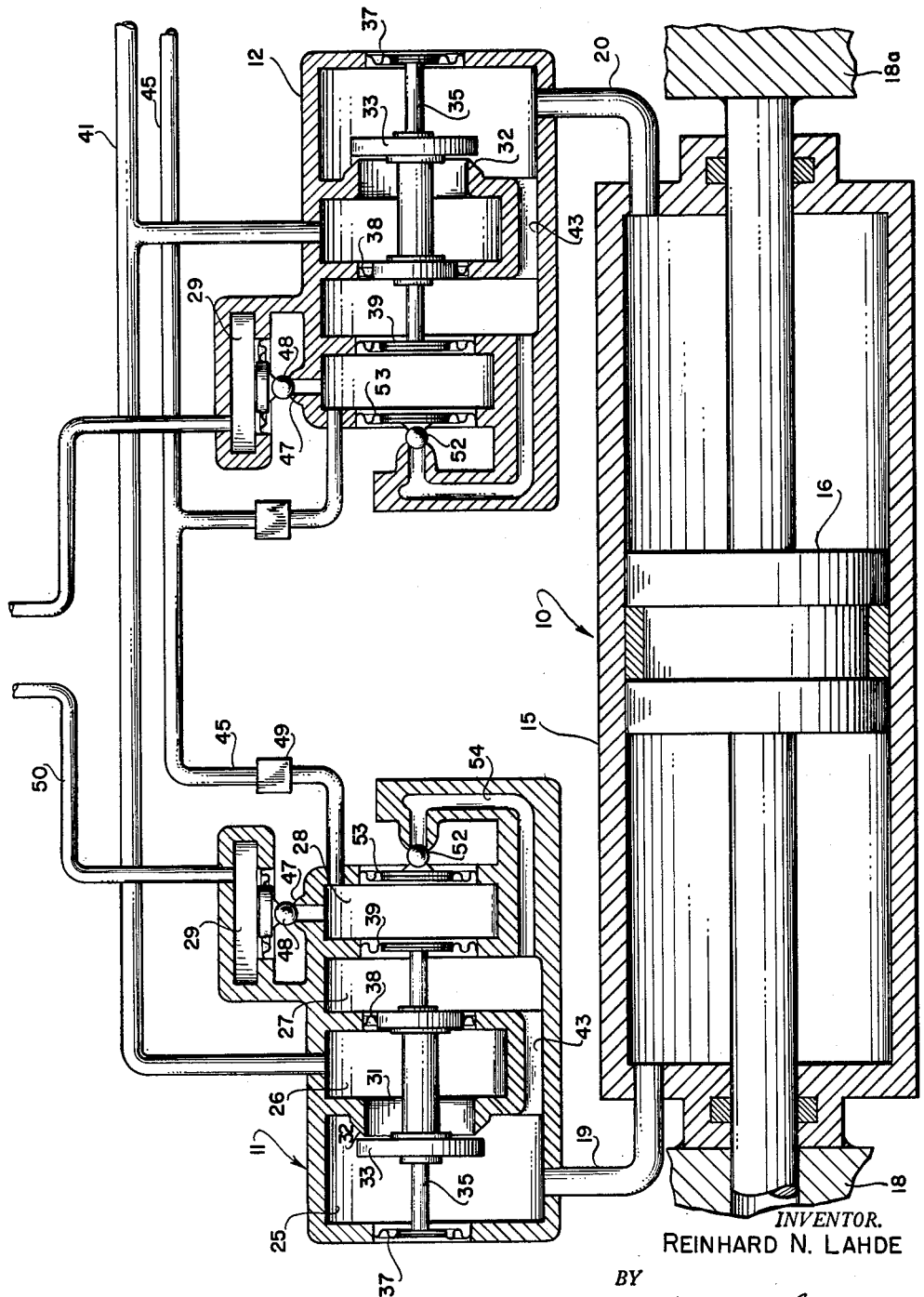
INVENTOR.
REINHARD N. LAHDE

3,162,096
METHOD AND MEANS FOR PLATFORM
STABILIZATION
Reinhard N. Lahde, Tarzana, Calif., assignor to Lockheed Aircraft Corporation, Burbank, Calif.
Filed Jan. 23, 1961, Ser. No. 84,201
4 Claims. (Cl. 91—421)

The present invention relates to a platform stabilization method utilizing particularly force-servos.

Angularly stable platforms are necessary where instruments or weapons requiring a stable reference are mounted on vehicles such as ships, aircraft or surface vehicles which are subject to angular disturbances. In extremely difficult situations, even ground-based platforms must have some stabilization to counteract the effect of disturbances from man-made or natural earth tremors caused by movements in the area. The usual manner in achieving this stabilization is to provide a position feed-back type servo-mechanism between the platform and the supporting structure. The position servo is that type which first senses an angular displacement of the supporting structure, then generates a signal to correct or restore the platform to its original angular position. Error input is provided by an angular error between the platform and the reference plane which is usually determined by a gyroscope. The disadvantage of such an angular or position feed-back system is that there must first be an angular disturbance before a signal is available to correct the platform to its original stable position.

The invention disclosed herein circumvents the basic drawback of platform stabilization methods and means of present-day by suspending the platform through a force servo. A force servo by definition is one whose force output rather than its position is a function of the input. This means that movement of the support will simply result in a displacement of the portion of the servo to which the platform is attached an amount equal to the support movement. This will not alter the output force of the servo and hence will have no influence on the platform position. Therefore, the platform (further described infra) will not be disturbed by motions of the support structure. This maintenance of the platform in its original plane of reference also eliminates problems relative to the tendency of the platform to follow movement of the support structure, i.e., angular movements.

This principle of operation may be better understood in relation to Newton's Law of Acceleration, i.e., $F = a \times m$ where $m$ = mass, $F$ = Force acting on the mass, and $a$ = acceleration of the mass resulting from action of the Force. As related to the present invention, the cylinder and its connected load (the platform 18 in the following description) follow an acceleration of the piston (16), its rod (17) and its support structure (18a) only if an appropriate force is also supplied to the cylinder. If, as in the present invention, the movement of the piston and rod, as applied by the support, does not produce a change in the pressure acting on the cylinder, then the level of acceleration of the cylinder-load combination should not change, i.e., if the cylinder is at rest prior to the movement of the piston and rod it will remain at rest even though the piston and rod are moved. Hence, acceleration of the load is effectively zero and the load (platform) remains static.

Even though the major disturbances are removed, there are inevitably other disturbances although of smaller magnitude that must be counteracted. The force servo has a very high speed of response; therefore, it is possible to use a higher gain for stabilizing the platform, thereby obtaining a higher degree of angular accuracy.

It is an object of this invention to provide a platform stabilization method having a high degree of sensitivity and accuracy. The force servo which has a very high speed response is used in the supporting structure thereby minimizing the effect of disturbances.

It is another object of the present invention to provide a platform stabilization means which utilizes a unique force servo structure.

It is another object of the present invention to provide a platform stabilization means and method with which a small command signal pressure may be utilized to control and a relatively high fluid pressure which operates the actuator.

The simplest type of force servo can be described as a piston-cylinder actuator having a supply pressure input and a constantly open poppet valve for spillover output, in which the amount of flow supplied to the device is under all possible operational conditions at least slightly larger than the maximum flow required for the fastest possible operational movement of the piston. The input force against the poppet valve which is always open will amplify the pressure of the piston-cylinder combination such that the output force of the piston will be proportional to the internal pressure or the input force against the poppet valve. Any movements of the output piston, so long as they are inside the performance envelope of the device, simply change the amount of spillage to the poppet valve but do not change the force on the piston so long as the poppet valve has a constant force applied to it. The disadvantage of this type of force servo is that there is a considerable amount of spillage and therefore wastage.

The force servo and actuator shown in the figure overcomes the problem of spillage. The force servo of the figure has a piston and cylinder fluid type actuator 10 and two valves 11 and 12. Actuator 10 has a cylinder 15 and a piston 16 to which is attached a rod 17. In practice, either the piston rod 17 or the cylinder 15 is typically attached to the platform 18 representatively illustrated which is to be stabilized and which is of conventional construction and the other element is connected to the surface or structure 18a with respect to which the platform is to be supported or from which it is to be suspended.

The platform 18 is supported by one or a plurality of actuators 10, dependent upon the particular application to which it is adapted. For example, adaptation of the invention to support the aforementioned weapons-carrying stable platform on a ship normally requires the use of at least three actuators in providing the required support. These actuators are conventionally positioned in a fashion similar to the manner in which the legs of a table support the top, one structural portion, e.g., the cylinder 15, being attached to the platform and the other, e.g., the piston rod 17, being attached to the deck of the ship. Presuming the establishment of such a structural relationship, movement of the support 18a, and therefore rod 17 and piston 16 to which it is connected, results in its movement relative to the cylinder 15 in like amount (absent frictional considerations and presuming complete freedom of fluid flow upon initiation of such movement). The original position of the cylinder 15 and the attached platform 18 are, therefore, maintained. Due to extraneous forces such as gravity acting upon the assembly it becomes necessary in practice to provide means for overcoming such forces in facilitating maintenance of such position. This is accomplished by the associated structure described herein.

The ends of the closed end cylinder 15 have ports through which they communicate via conduits 19 and 20 to the valves 11 and 12. Valve 12 is identical to valve 11. Each has five chambers 25, 26, 27, 28 and 29. Opening 31 is provided between chambers 25 and 26 providing a valve seat 32 for valve head 33 which is integral with the shaft 35. Shaft 35 is also integral with the membranes 37, 38 and 39, providing fluid tight flexible seals adjacent their respective chambers 25 through 28.

Space 26 is provided with a relatively high supply pressure of fluid, either a gas or liquid, through line 41. The chambers 25 and 27 communicate with each other through the passage 43 so that their pressures are always equal. The area of the openings 31 and the effective area of membrane 38 are nearly equal so that the influences of pressure difference (that is, supply pressure minus the pressure in the adjoining spaces) cancel out with regard to their axial force on the shaft 35. Membrane 39 is slightly larger than the membrane 37, which has the following effect: so long as pressure exists in spaces 25 and 27; which spaces communicate with the left side of the actuator 10 through conduit 19 (leading from valve 11), the valve unit on shaft 35 has a tendency to move toward the right thereby closing the valve head 33. A pressure increase in spaces 25 and 27 results in a greater pressure differential and an increased closing tendency. This tendency is resisted and ultimately controlled counteracted by the pressure in chamber 28 supplied through intermediate supply line 45. So long as the aforementioned pressure differential is greater than the resisting force the valve remains closed. A sufficient reduction in pressure differential, resulting from a pressure decrease in the chambers 25 and 27, permits the resisting force to overcome the closing force and the valve is caused to open.

Chamber 28 is provided with an opening 47 and a poppet valve head 48 providing for spillover of the medium pressure fluid delivered to the chamber 28 through lines 45 and orifice 49. Chamber 29 is provided with a signal pressure through the conduit 50. The space 28 together with the spillover valve head 48 and the orifice 49 form a force-amplifier transforming the signal pressure in line 50 into a force to move the valve unit on shaft 35 to the left. This is a two-stage amplification. The dimensions can be arranged so that a maximum signal pressure of about 10 pounds per square inch in line 50 amplifies to a medium pressure of say 100 pounds per square inch in chamber 28 to control a pressure in line 41 of the range of 3000 pounds per square inch for the ultimate control of actuator 10. Pressure in signal pressure lines 50 may be varied so that the pressure in one side of actuator 10 may be different than that in the other as would be necessary where a constant force such as gravity is to be opposed.

When the pressure in the actuator 10 has adjusted itself so that the valve 33 has seated, and if now the piston 16 of the actuator 10 should move to the right, the pressure in the left hand side of the actuator 10 falls off slightly. This disturbs the equilibrium of the forces acting on the valve unit on shaft 35 in valve 11 in such a way as to open the valve head 33 just enough to supply a volume of liquid to keep the piston pressure nearly constant. If, however, the actuator piston 16 should move to the left, then there would be a tendency to build up a higher pressure on the left side of the piston 16 which would tend to keep the valve head 33 of valve 11 tightly closed. A relief valve 52 carried by membrane 53 on the outside of the chamber 28 which closes off the passage 54 leading from the chamber 27 is designed to keep the excess pressure very small by permitting the excess fluid to escape around the valve 52.

An opposite action in each instance occurs in valve 12 from that of valve 11 when the piston 16 or cylinder 15 is caused to move. Hence, a forced actuation is accomplished with respect to both sides of the piston 16 equal pressures being maintained by operation of the bleed valve 52. A rapid action in either direction can thereby be controllably actuated in either direction. The force servo and actuator 10 has been discussed and is representatively illustrated in the figure as if the piston shaft 17 were fixed to the surface of the earth or vehicle on which the platform is to be carried and as if the cylinder 15 were attached to the platform itself so that movements by the supporting vehicle or earth do not disturb the platform which is attached to the cylinder. It is obvious that if the cylinder were attached to the surface of the earth or vehicle and the piston rod 17 attached to the platform the result would be the same regardless.

Note that spillage of the high pressure source of fluid entering the system from lines 41 is restricted to that time when valve head 33 is closed over the valve seat 32 and the pressure in one side or the other of the actuator builds to the point where valve 52 is unseated to release the excess pressure. Diaphragms 37 and 53 may be constructed with relative dimensions such that outside or ambient pressures do not affect operation, i.e., their effective areas exposed to the ambient are substantially equal and, therefore, balanced insofar as ambient exposure is concerned.

It will be seen that by use of a force servo to support a platform the displacement of the supporting structure, the earth or a vehicle, results in equivalent servo motion without changing the force supporting the platform and therefore without having any disturbing influences on the platform. As a consequence, this concept leads to a greater improved platform stabilization. It will be noted further that even the smallest change in pressure will speedily cause servo reaction. In accordance with recognized hydraulic phenomenon, i.e., the substantially incompressible nature of the liquid used in the system, this reaction is virtually instantaneous, taking place even before movement of the platform occurs and thereby eliminating a problem common to position sensors. The actuator 10 is shown in the horizontal position in the figure which will be useful where lateral disturbances are expected to the platform. It should be understood that this showing in no way restricts the use of actuator 10. In a vertical position, its most likely use is where the platform supported is on the surface of the earth or on the bed of a vehicle. It will be further understood that a platform using the present invention and its method may be suspended from an overhead structure as well.

Having described the details of my invention, I claim the following combinations and their equivalents.

I claim:

1. A fluid actuator attached between and supporting a platform with respect to a separate structure comprising a cylinder, a piston positioned in said cylinder for relative movement, a valve for each end of said cylinder, conduits connecting each end of said cylinder to one of said valves, a source of high pressure fluid, means to conduct the high pressure fluid to each valve means, means to simultaneously vary the opening of each valve means responsive to pressure changes in each end of said cylinder to maintain constant pressure therein, and pressure relief means to bleed excess fluid from said valves in maintaining said constant pressure.

2. Means for supporting a platform in a stable position relative to separate structure comprising at least one fluid actuator attached between the platform and the structure from which the platform is to be supported, and a pair of identical valves connected to selectively supply a relatively high pressure fluid to each side of each actuator, each valve means including a valve head, a valve seat, and means to vary the opening between the valve head and the valve seat relative to the internal pressure of the side of the actuator to which the valve is connected so as to maintain a constant pressure on either side of the actuator regardless of its internal movement.

3. Means for supporting a platform in a stable position relative to separate structure comprising a piston and cylinder fluid actuator mounted between the platform and the structure, and a separate valve connected to supply a relatively high pressure to each side of said actuator, each said valve including a valve head and a valve seat, means to vary the opening between said valve head and said valve seat relative to the internal pressure of the side of said actuator to which the said valve is connected, and pressure bleed means to relieve the internal pressure of the actuator when there is a build-up of pressure and the valve head is seated, whereby a constant pressure is maintained on either side of the actuator regardless of its internal movement.

4. A force servo comprised of a fluid actuator including a cylinder and a piston, valve means for each end of the cylinder, each valve means including five adjacent chambers, passage means connecting each end of the cylinder with a first chamber in the valve means associated therewith in fluid flow relation, a diaphragm closing the side of the first chamber opposite the side adjacent the second chamber, an opening between the first and second chambers comprising a valve seat, a diaphragm between the second and third chambers approximately the size of the opening between the first and second chambers, a diaphragm between the third and fourth chambers slightly larger than the diaphragm closing one side of the first chamber, a valve rod extending from and fixed to the diaphragms between the third and fourth chambers, the second and third chambers, and the diaphragm closing one side of the first chamber, a valve head fixed to the valve rod in the first chamber adjacent the valve seat between the first and second chambers, an open communication means between the first and third chambers, a diaphragm on the side of the fourth chamber opposite the third chamber carrying a valve head exteriorly, a passage from the third chamber terminating in a valve seat adjacent the last mentioned valve head, an opening in the fourth chamber forming a valve seat, the fifth chamber adjacent the opening in the fourth chamber having a diaphragm adjacent the valve seat and carrying therewith a valve head to seat on the fourth chamber valve seat, means to conduct a source of high pressure fluid to the second chamber, means to conduct a source of intermediate pressure fluid to the fourth chamber, and means to conduct a source of signal pressure fluid to the fifth chamber whereby the pressure in the fourth chamber will be controlled by the signal pressure in the fifth chamber which governs the relationship of the valve carried by the fifth chamber diaphragm and the fourth chamber valve seat which pressure in the fourth chamber controls the position of the valve between the first and second chambers as a result of the pressure on the diaphragm between the third and fourth chambers and the valve rod integral therewith in opposition to the pressure in the end of the actuator cylinder communicating with the first chamber.

References Cited in the file of this patent
UNITED STATES PATENTS

| | | |
|---|---|---|
| 2,012,162 | Furlong | Aug. 20, 1935 |
| 2,182,659 | Cook | Dec. 5, 1939 |
| 2,375,946 | Reichelt | May 15, 1945 |
| 2,613,903 | Platz | Oct. 14, 1952 |
| 2,939,431 | Bottje et al. | June 7, 1960 |
| 3,028,175 | Eckman | Apr. 3, 1962 |
| 3,035,608 | Ray | May 22, 1962 |